US007739663B2

(12) United States Patent
Newcomb, Jr.

(10) Patent No.: US 7,739,663 B2
(45) Date of Patent: Jun. 15, 2010

(54) METHOD, SYSTEM AND PROGRAM PRODUCT FOR VALIDATING A RUNTIME ENVIRONMENT

(75) Inventor: William L. Newcomb, Jr., Queen Creek, AZ (US)

(73) Assignee: International Business Machines Corporation, Armonk, NY (US)

(*) Notice: Subject to any disclaimer, the term of this patent is extended or adjusted under 35 U.S.C. 154(b) by 1065 days.

(21) Appl. No.: 11/435,460

(22) Filed: May 16, 2006

(65) Prior Publication Data
US 2007/0288904 A1 Dec. 13, 2007

(51) Int. Cl.
G06F 9/44 (2006.01)
(52) U.S. Cl. .................. 717/126; 717/124; 717/127; 717/128; 717/131; 714/38; 714/52
(58) Field of Classification Search .................. 717/126, 717/120, 127, 128, 130, 131, 139, 124; 714/38, 714/807, 819, 52; 709/202, 224, 206; 707/10
See application file for complete search history.

(56) References Cited

U.S. PATENT DOCUMENTS

| 5,602,729 | A | * | 2/1997 | Krueger et al. ............... 717/124 |
| 5,841,982 | A | * | 11/1998 | Brouwer et al. .............. 709/224 |
| 6,324,670 | B1 | * | 11/2001 | Henriksen ................... 714/807 |
| 6,880,149 | B2 | | 4/2005 | Cronce ........................ 717/126 |
| 7,000,151 | B2 | * | 2/2006 | Dwyer .......................... 714/38 |
| 7,178,142 | B2 | * | 2/2007 | Bennett et al. ............... 717/168 |
| 2002/0129023 | A1 | | 9/2002 | Holloway et al. |
| 2003/0177412 | A1 | | 9/2003 | Todd |
| 2003/0188231 | A1 | | 10/2003 | Cronce |
| 2004/0003316 | A1 | * | 1/2004 | Meng et al. .................... 714/13 |
| 2004/0015748 | A1 | * | 1/2004 | Dwyer ......................... 714/52 |
| 2004/0143820 | A1 | * | 7/2004 | Jong .......................... 717/126 |
| 2005/0149823 | A1 | * | 7/2005 | Lee ............................ 714/758 |
| 2005/0228795 | A1 | * | 10/2005 | Shuster ........................ 707/10 |
| 2006/0080533 | A1 | * | 4/2006 | Bradbury .................... 713/170 |

(Continued)

OTHER PUBLICATIONS

Title: Enabling control over adaptive program transformation for dynamically evolving mobile software validation, Author: Jochen et al, Source: ACM, publication date: Jul. 2005.*
Title: Performance evaluation of checksum-based ABFT, Author: Al-Yamani et al, source: IEEE, publication date: Oct. 2001.*

Primary Examiner—Chameli C Das
(74) Attorney, Agent, or Firm—Arthur J. Samodovitz

(57) ABSTRACT

A method, system and program product for validating a runtime environment deployed across multiple computing systems is disclosed. The method includes generating, using a validation tool, a first set of checksums corresponding to message flows in a first instance of a runtime module deployed on a first system, the validation tool excluding in the first set of checksums generated any unique system data corresponding to the first system, while reading only common executable data of the runtime module. The method further includes running the validation tool on at least a second system for generating a second set of checksums corresponding to message flows in a second instance of the runtime module deployed on the second system. Further, the method includes comparing the second set of checksums to the first set of checksums to validate that the runtime module deployed on the second system is identical to the first system.

9 Claims, 6 Drawing Sheets

U.S. PATENT DOCUMENTS

2006/0136780 A1* 6/2006 Meng et al. .................. 714/13
2006/0161627 A1* 7/2006 Bradbury .................. 709/206
2007/0162621 A1* 7/2007 Condorelli et al. ............. 710/1
2007/0226580 A1* 9/2007 King et al. .................. 714/758

* cited by examiner

METHOD, SYSTEM AND PROGRAM PRODUCT FOR VALIDATING A RUNTIME ENVIRONMENT

FIELD OF THE INVENTION

The present invention relates to a method, system and computer program product for validating a runtime environment. More particularly, the present invention relates to a method, system and computer program product for validating a runtime environment deployed across multiple servers on a network.

BACKGROUND OF THE INVENTION

Most large enterprises make use of integrated systems made up of a variety of different computer systems and software applications. Often, separate component programs are deployed widely on many of the computer systems. When a component program is deployed in an inconsistent manner through human errors or deployment errors, a business may get different results depending on which computer system is processing the computer program. As such, there is a need for an efficient way to be able to exchange data effectively in an integrated system as well as a need to be able to manage any inconsistencies in configurations of programs run on one system to the next.

SUMMARY OF THE INVENTION

In one embodiment, the present invention provides a method of validating a runtime environment deployed across multiple computing systems. The method includes generating, using a validation tool, a first set of checksums corresponding to message flows in a first instance of an application code of a runtime module deployed on a first computing system of one or more computing systems on a network, the validation tool excluding in the first set of checksums generated a unique system data portion of the application code while reading only a common executable data portion of the first instance of the application code corresponding to the runtime module deployed on the first computing system of the one or more computing systems. In an embodiment, the generating step further includes invoking a utility program to list contents of each message flow defined in the first instance of the application code corresponding to the runtime module deployed on the first computing system. In an embodiment, the generating step further includes identifying a starting point and an ending point for each message flow defined in the first instance of the application code corresponding to the runtime module deployed on the first computing system in order to compute a separate checksum for each message flow deployed on the first computing system. The method further includes writing the first set of checksums generated to a first checksum file, and running the validation tool on at least a second computing system on the network for generating a second set of checksums corresponding to each message flow in a second instance of the application code of the runtime module deployed on the second computing system. Further, the method includes writing the second set of checksums generated to a second checksum file and comparing the second set of checksums generated for the second instance of the application code with the first set of checksums generated for the first computing system to validate that the runtime module deployed on the second computing system is identical to the first computing system. The running step further includes invoking the utility program to list contents of each message flow defined in the second instance of the application code corresponding to the runtime module deployed on the second computing system, excluding a corresponding unique system data portion of the application code deployed on the second computing system while reading only a corresponding common executable data portion of the application code corresponding to the runtime module deployed on the second computing system and identifying a starting point and an ending point for each message flow defined in the second instance of the application code of the runtime module deployed on the second computing system in order to compute a separate checksum for each message flow deployed on the second computing system. The comparing step further includes writing the first set of checksums generated to the first checksum file stored on a designated computing system different from the one or more computing systems and writing the second set of checksums generated to the second checksum file stored on the designated computing system different from the one or more computing systems. In an embodiment, the writing step further includes writing the first set of checksums generated to the first checksum file stored on a designated computing system chosen from the one or more computing systems and writing the second set of checksums generated to the second checksum file stored on the designated computing system chosen from the one or more computing systems. In an embodiment, the method further includes identifying any computing system having a different set of checksums than the first set of checksums generated for the first computing system. The identifying step further includes identifying an execution group name, a message flow name and a broker name associated with a respective instance of the application code corresponding to the runtime module deployed on the any computing system having the different set of checksums than the first set of checksums generated for the first computing system.

In another embodiment, the present invention provides a system for validating a runtime environment deployed across multiple servers on a network. The system includes a runtime module deployed on one or more servers connected to a network, the runtime module including an application code and a runtime code for executing the application code and a validation tool running on at least two servers of the one or more servers, the validation tool generating a first set of checksums for the application code corresponding to the runtime module deployed on a first server of the two servers and a second set of checksums corresponding to the application code corresponding to the runtime module deployed on a second server of the two servers, the validation tool being configured to exclude in the generation of each of the first set of checksums and the second set of checksums any unique server identification data portion of the application code that is specific to each of the two servers while incorporating a common executable data portion of the application code on each of the two servers and to compare the second set of checksums generated to the first set of checksums generated in order to validate that the application code deployed on the second server is identical to the application code deployed on the first server. The validation tool is further configured to invoke a utility program provided in the runtime module deployed on each of the first server and the second server, the utility program being configured to list contents of each message flow defined in the application code corresponding to the runtime module deployed on each of the first server and the second server of the two servers. Furthermore, the validation tool is configured to identify a starting point and an ending point for each message flow of the set of message flows defined in the application code deployed on each of the first server and the second server of the two servers in order to generate the first set of checksums and the second set of checksums. In an embodiment, the validation tool is configured to write to a file each of the first set of checksums and the second set of checksums generated for the set of message flows defined in the application code deployed on the first server and the second server of the two servers, the file being stored on a designated server chosen from the one or more servers. Further yet, in an embodiment, the validation tool is configured to write to a file the respective set of checksums generated for the set of message flows defined in the application code for each of the two servers, the file being stored on a designated server different from the one or more servers. In yet another embodiment, the validation tool is configured to identify an execution group name, a message flow name and a broker name associated with any server of the one or more servers whose set of checksums computed is different than the first set of checksums generated for the first server.

In yet another embodiment, the present invention provides a computer program product for validating a runtime environment deployed across multiple servers on a network. The computer program product further includes first program instructions to compute, using a validation tool, a first set of checksums corresponding to a set of message flows defined in an application code of a runtime module deployed on a first server of a plurality of servers connected via a network, the validation tool excluding in computing the first set of checksums any unique server identification data portion specific to the first server and to read only a common executable data portion of the application code deployed on the first server. In an embodiment, the first program instructions include instruction to invoke a utility to list contents for each of the set of message flows defined in the application code corresponding to the runtime module deployed on the first server. Further, in an embodiment, the first program instructions include instructions to write to a file the first set of checksums generated for the application code corresponding to the runtime module deployed on the first server. The computer program product further includes second program instructions to run the validation tool on a second server of the plurality of servers for computing a second set of checksums corresponding to a set of message flows defined in the application code corresponding to the runtime module deployed on the second server, the validation tool excluding in computing the second set of checksums any unique server identification data portion specific to the second server and to read only a common executable data portion of the application code deployed on the second server. In an embodiment, the second program instructions include instructions to invoke a utility to list contents for each of the set of message flows defined in the application code corresponding to the runtime module deployed on the second server and to write to the file the second set of checksums generated for the application code corresponding to the runtime module deployed on the second server. The computer program product further includes third program instructions to compare the second set of checksums generated for the second server with the first set of checksums generated for the first server to determine whether the application code corresponding to the runtime module deployed on the second server is identical to the application code corresponding to the runtime module deployed on the first server. The computer program product further includes fourth program instructions to identify any server of the plurality of servers whose set of checksums generated is different from the first set of checksums generated for the first server. In an embodiment, the fourth program instructions include instructions to identify an execution group name, a message flow name and a broker name associated with any server of the plurality of servers whose set of checksums computed is different than the first set of checksums generated for the first server. Preferably, the first, second, third and fourth program instructions are stored on the computer readable medium.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
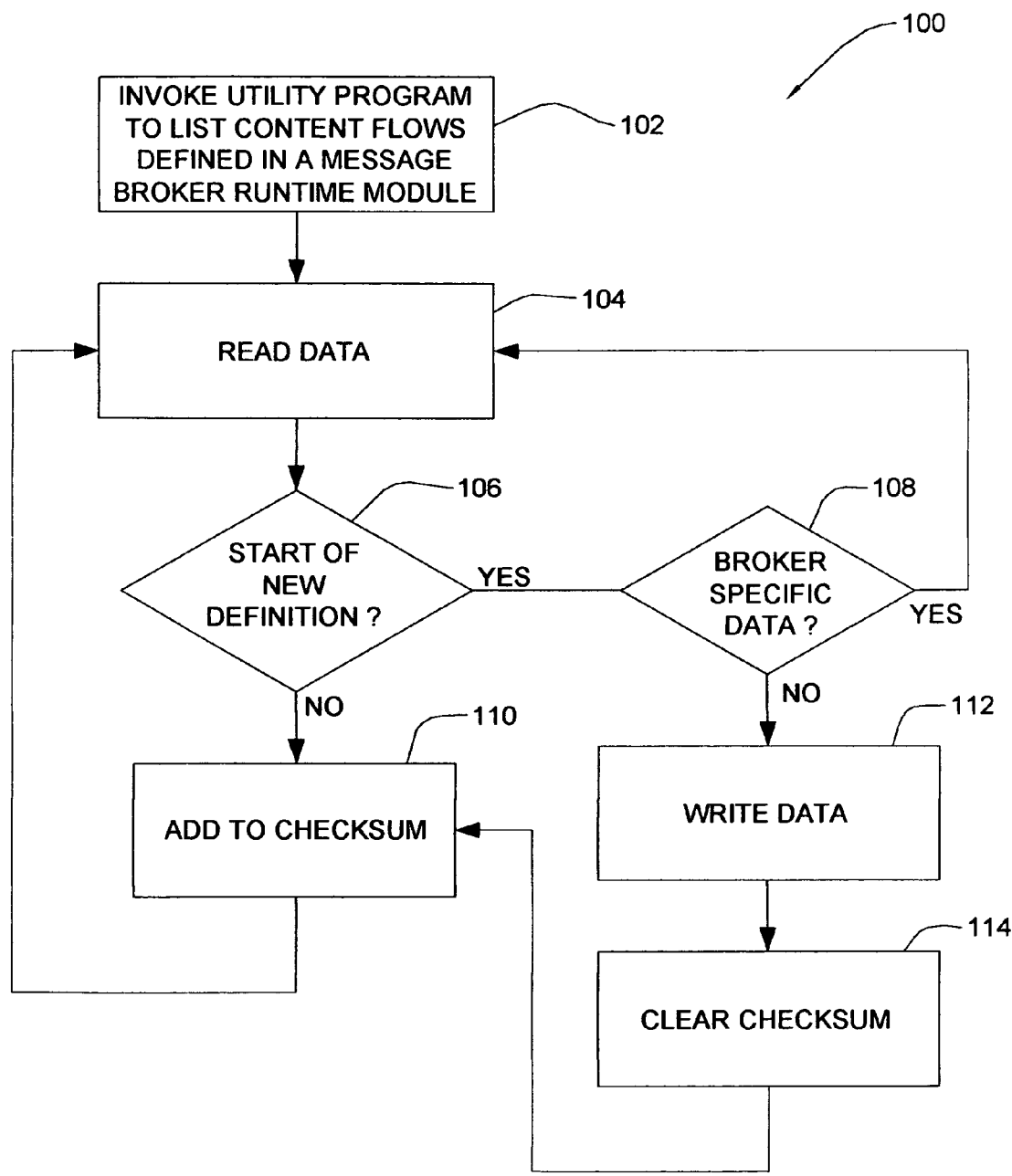
FIG. 1 is a flowchart depicting a method of creating a checksum for a runtime module deployed on a computing system, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 2:
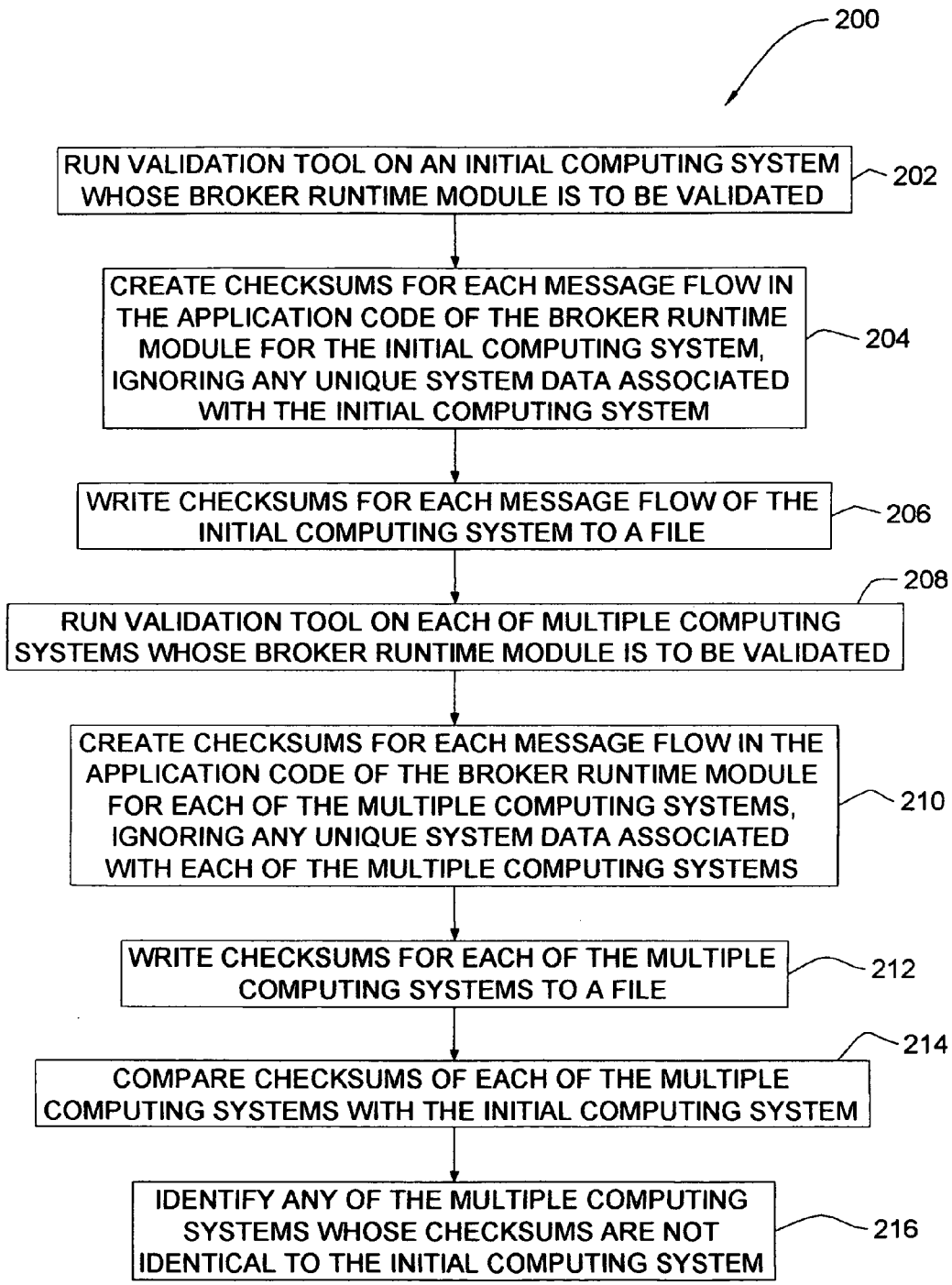
FIG. 2 is a flowchart depicting a method of validating a runtime environment deployed across multiple computing systems, in accordance with an embodiment of the present invention.

Reference is now made to FIGS. 1 and 2, which illustrate a method of validating a runtime environment, in accordance with an embodiment of the invention. As used herein, the term "runtime environment" or "runtime module" or "broker runtime module" refers to a runtime environment of a commercially available message broker application program, preferably, the Websphere® MQSeries® Message Broker application program that is commercially available from International Business Machines Corporation (IBM). The Websphere® MQSeries® Message Broker application program is a three-tiered architecture comprising a user interface, a configuration manager and a broker runtime module, as described further herein below with respect to FIG. 4. In an embodiment, the user interface runs on a user's computing system, such as, a desktop or a laptop. The user interface is configured to connect to the configuration manager, which in one embodiment, may run on another server. The configuration manager is configured to deploy changes to the broker runtime module, which in one embodiment, may run on a different server. Furthermore, the broker runtime module includes a message broker code, an application code and one or more utility programs, such as the utility program, MQSireproperties, supplied with the IBM® Websphere® MQSeries® Message Broker application program. The message broker code causes the execution of the application code. In an embodiment, the application code comprises one or more message flows that are stored in a database and are deployed by the configuration manager. In particular, when the message broker application starts up, the message broker code reads the application code stored in the database to create the Message Broker application runtime environment.

Turning to FIG. 1, numeral 100 shows an embodiment of a method of creating a checksum for a runtime module (for instance, IBM's MQSeries® Message Broker runtime module) deployed on a computing system, using a validation tool or validation code, according to the present invention. The method of generating a checksum starts at step 102 with the validation tool invoking a utility program provided in the message broker application program, such as, the MQSireproperties utility program provided in IBM's MQSeries® Message Broker application program, to list contents of each message flow of a plurality of message flows defined in a first instance of the application code corresponding to the runtime module deployed on the computing system. In an embodiment, the utility program comprises the MQSireproperties utility program provided in the IBM® Websphere® MQSeries® Message Broker application program. In particular, the utility program reads the application data and provides to the validation tool a list of the contents, that is, each line contained in each and every message flow defined in the runtime module. The validation tool reads in step 104 the data provided by the utility program. Further, in step 106, the validation tool determines for each line of the application code data read whether or not the line represents the start of a new definition, that is, the beginning of a new message flow. In this regard, the validation tool identifies a starting point and an ending point for each message flow defined in the runtime module in order to compute a separate checksum for each message flow defined in the runtime module. If the data contained in the line read represents the start of a new definition in step 106, then the validation tool further determines in step 108 whether or not the data contained in the line read represents unique system data or broker specific data, that is, data that is unique to a computing system. If the application data read is determined to be unique system data or broker specific data, the validation tool ignores the unique system data and goes back to step 104 to read the next line of the application code data contents provided by the utility program. On the other hand, if in step 106, the validation tool determines that the data contained in the line read does not represent the start of a new definition or a new message flow, the validation tool adds to the checksum in step 110 the data to create a checksum for the current message flow and goes back to step 104 to read the next line of the application code data contents. Further, in step 108, if the application data read is determined to be common executable data of the new message flow and not unique system or broker specific data, then the validation tool writes to a file the name of the preceding message flow and the checksum created for the preceding message flow so that the checksum created for that message flow can be used for a comparison at a later point. Further, the validation tool clears the checksum created for the preceding message flow in step 114 and adds in step 110 the data read for the new message flow to create a checksum for the new message flow. The validation tool goes back to step 104 and the process continues until each and every line in every message flow listed by the utility program in step 102 has been read and a checksum has been created for each message flow comprising the application code. Accordingly, the validation tool excludes in the set of checksums generated for the set of message flows any unique system data portion of the application code of the runtime module that is specific to the system being validated, while reading only a common executable data portion of the application code of the runtime module deployed on the system that is common to each instance of the runtime module deployed on any system being validated.

Referring to FIG. 2, numeral 200 shows an embodiment of a method of validating a runtime environment deployed across multiple computing systems, in accordance with an embodiment of the present invention. In step 202, the validation tool is run on an initial computing system or broker whose runtime module is to be validated. The validation tool invokes the utility program to list contents of each message flow defined in an instance of an application code of a runtime module deployed on the initial computing system's broker runtime module. The validation tool creates or computes or generates in step 204 a checksum for each message flow defined in the application code of the initial computing system's broker runtime module, ignoring a or any unique system or broker specific data associated with the initial computing system, while reading only a common executable data portion of the application code, as described with respect to FIG. 1. As such, a set of checksums corresponding to the message flows in a first instance of an application code of a runtime module deployed on the initial computing system is generated. The validation tool writes to a file in step 206 the checksums created for each message flow defined in the application code for the initial computing system. Further, the validation tool is run in step 208 on each of one or more computing systems whose broker runtime module is to be validated. For each computing system that the validation tool is run on in step 208, the validation tool creates in step 210 a checksum for each message flow defined in the application code of each of the computing system's broker runtime module, as described herein above with respect to FIG. 1, identifying a starting point and an ending point for each message flow, ignoring any unique system or broker specific data associated with a particular computing system, while reading only a common executable data portion of the application code deployed on each of these computing systems. Further, the validation tool writes to a file in step 212 the respective checksums for the respective message flows comprising the application code for each computing system's broker runtime module. In an embodiment, the checksums are written to a file, for instance, a database file on a designated system chosen from one of the computing systems. In another embodiment, the checksums are written to a database file on a designated system different from one of the computing systems. Further, the set of checksums generated for a computing system may be written to the same file on one system or to different files on different systems. After the validation tool has computed and written to a file the checksum computed for each message flow comprising the runtime module deployed on each and every computing system, the validation tool compares in step 214 the set of checksums computed or created for a computing system with the set of checksums created in step 204 for the runtime module of the initial computing system. In step 216, the validation tool identifies any of the computing systems whose checksums are not identical to the initial computing system. In one embodiment, the validation tool identifies an execution group name, a message flow name and a broker or computing system for any computing system whose computed checksums are different than the checksums computed for the initial computing system.

Figure 3:
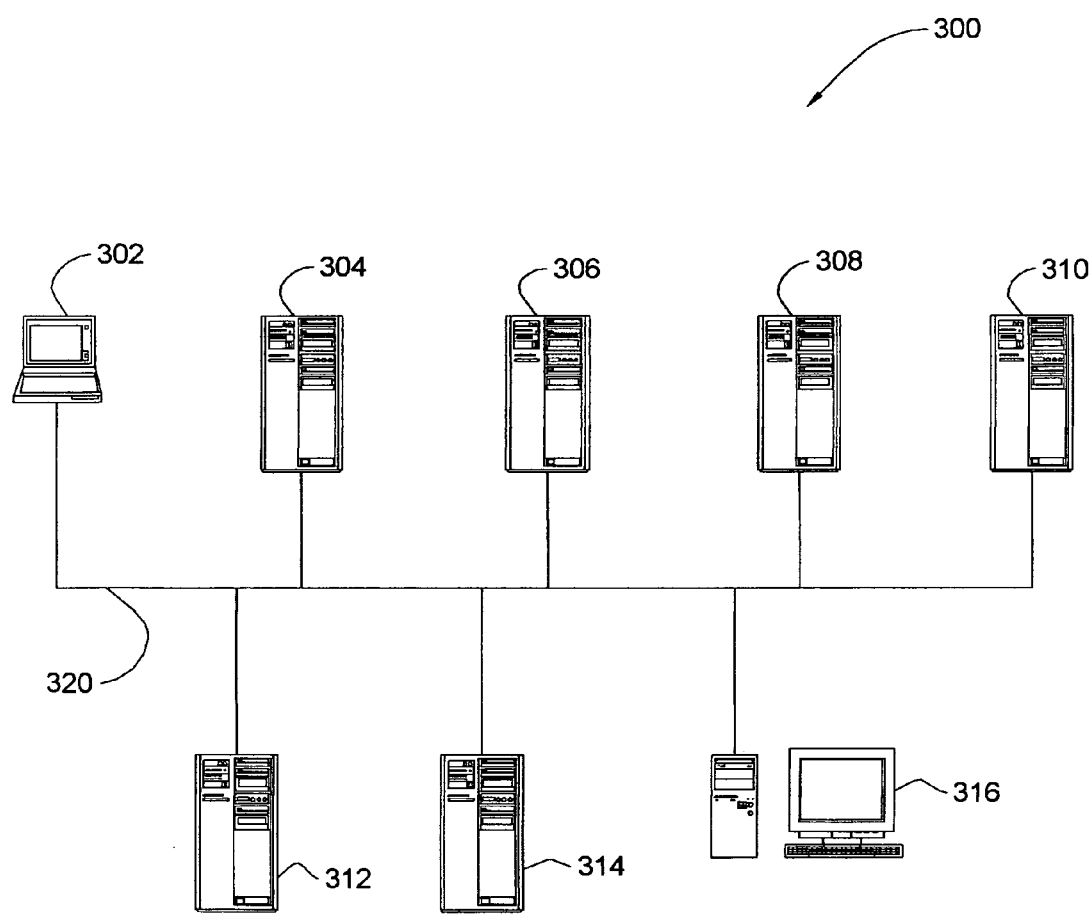
FIG. 3 is a schematic block diagram illustrating a system configured to validate a runtime environment deployed thereon, in accordance with an embodiment of the present invention.

Turning to FIG. 3, reference numeral 300 illustrates an embodiment of a network system comprising of clients 302 and 316 and multiple servers 304, 306, 308, 310, 312 and 314, with each of the clients and servers being connected via a communications channel 320, for instance, the Internet, which serves as a communications channel for the various servers in the system. The communications channel 320 may be, in one embodiment, an Ethernet communications channel, a wireless communications channel, or another equivalent communications channel. Although the depicted networked computing infrastructure 300 is shown to include two clients 302 and 316 and six servers, 304, 306, 308, 310, 312 and 314, the networked infrastructure 300 may comprise a combination of various network configurations having fewer or more clients and servers as well as alternate server configurations. In an embodiment, one or more of the servers 304, 306, 308, 310, 312 and 314, in the system 300 has deployed thereon a runtime module or environment that includes an application code and a runtime code, where the runtime code causes execution of the application code. If it runtime module deployed on any one or all of the servers 304, 306, 308, 310, 312 and 314 needs to be verified, then the validation tool is run on the desired server or servers so that the runtime environment deployed on the particular server can be verified. Further, in an embodiment, the user interface of the message broker application may run on a user's desktop, such as, client 302 and/or client 316. Furthermore, the configuration manager, which is used to deploy changes to the broker runtime module may be run on any of the servers 304, 306, 308, 310, 312 and/or 314.

Figure 4:
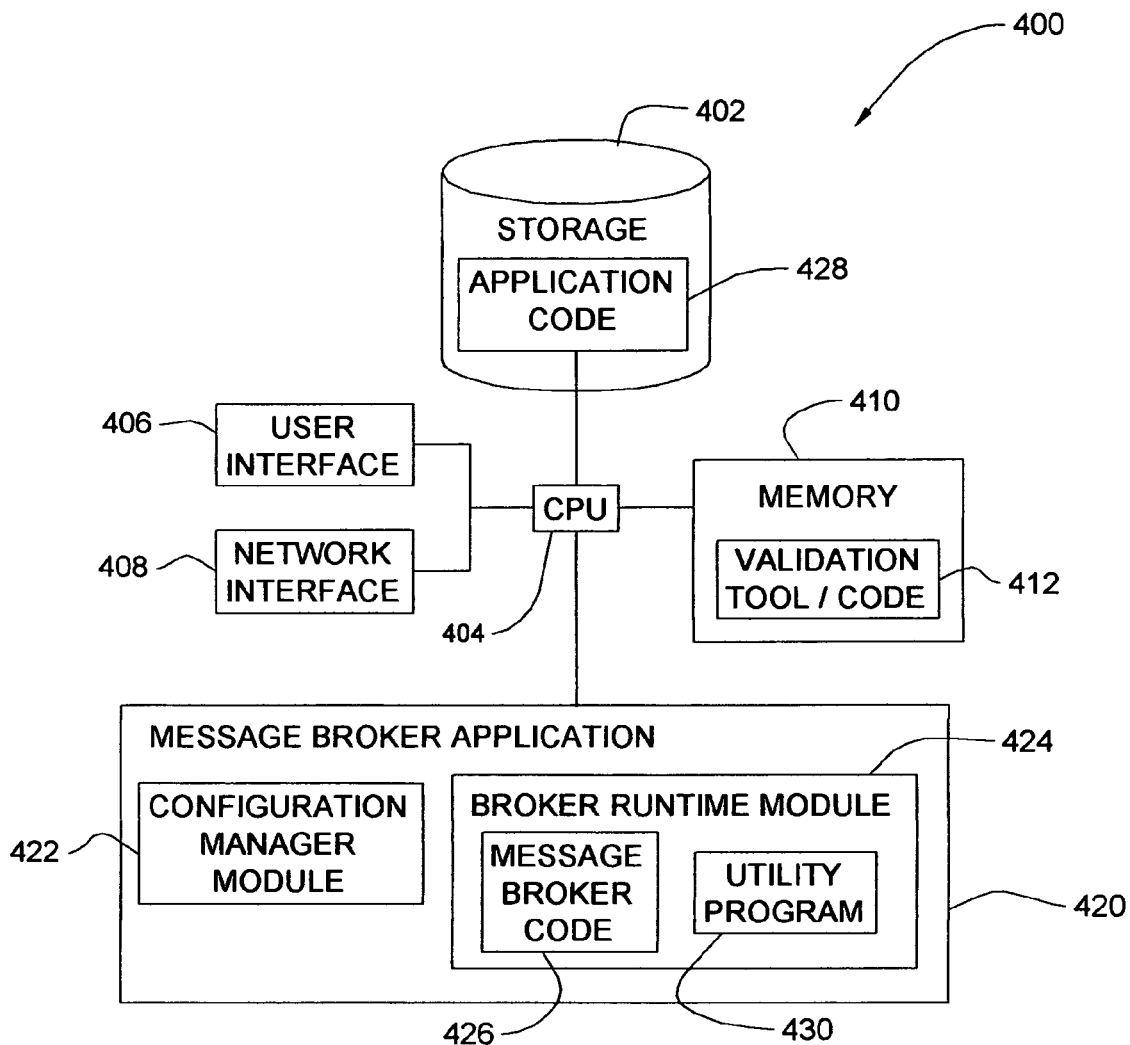
FIG. 4 is a schematic block system diagram illustrating a runtime environment deployed on a system having a validation tool stored thereon, the validation tool being configured to validate the runtime environment deployed on the system, in accordance with an embodiment of the present invention.

Reference is now made to FIG. 4, which illustrates a runtime environment deployed on a system 400 having a message broker application program 420 deployed thereon, in accordance with an embodiment of the present invention. Preferably, the computing system 400 includes a central processing unit (CPU) 404, a local storage device 402, a user interface 406, a network interface 408, and a memory 410. The CPU 404 is configured generally to execute operations within the computing system 400. The user interface 406, in one embodiment, is configured to allow a user to interact with the computing system 400, including allowing input data and commands from a user and communicating output data to the user. In an embodiment, the user interface 406 may run on a user's computing system, such as, a desktop or a laptop and be configured to connect to the configuration manager module of the message broker application 420. The network interface 408 is configured, in one embodiment, to facilitate network communications of the system/server 400 over the communications channel 420 of the network 400. The local memory 410 is configured, in one embodiment, to store several data and metadata files that may be used in conjunction with a runtime environment. In an alternative embodiment, some or all of these data and metadata files may be replicated in the local storage device 402. In a further embodiment, one or all of these data and metadata files may be stored exclusively in the local storage device 402 rather than in the memory 410. In another embodiment, one or all of these data and metadata files may be stored in distributed storage on the network system 400. Although the present description refers to "files," the present invention is understood to operate in substantially the same manner using other electronic memory and storage structures. Reference herein to a data file or metadata file is understood to equivalently refer to other such electronic memory and storage structures. Further, in one embodiment, as shown in FIG. 4, the message broker application program 420 run on the system 400 comprises a logic unit that contains a plurality of modules configured to functionally execute the necessary steps of integrating a variety of software applications. In particular, the message broker application program 420 includes a configuration manager module 422 and a broker runtime module 424. The configuration manager module 422 is configured to deploy changes to the broker runtime module 424 and, in one embodiment, each of the configuration manager module 422 and the broker runtime module 424 may run on separate systems or servers. Further, the broker runtime module 424 contains a message broker code 426 and a utility program 430. The message broker code 426 causes the execution of the application code 428, stored within the storage 402, in one embodiment. In an embodiment, the application code 428 comprises one or more message flows or programs that are stored in a database, for instance, storage 402 and are deployed by the configuration manager module 422. In particular, when the message broker application 420 starts up, the message broker code 426 reads the application code 428 stored in the database 402 to create the message broker application runtime environment 424. Further, the local memory 410 is configured to store the validation tool or code 412, which in one embodiment is run on system 400 (i.e., executed by CPU 404 via a staging memory portion") to validate the broker runtime module 424 of the message broker application 420.

Figure 5:
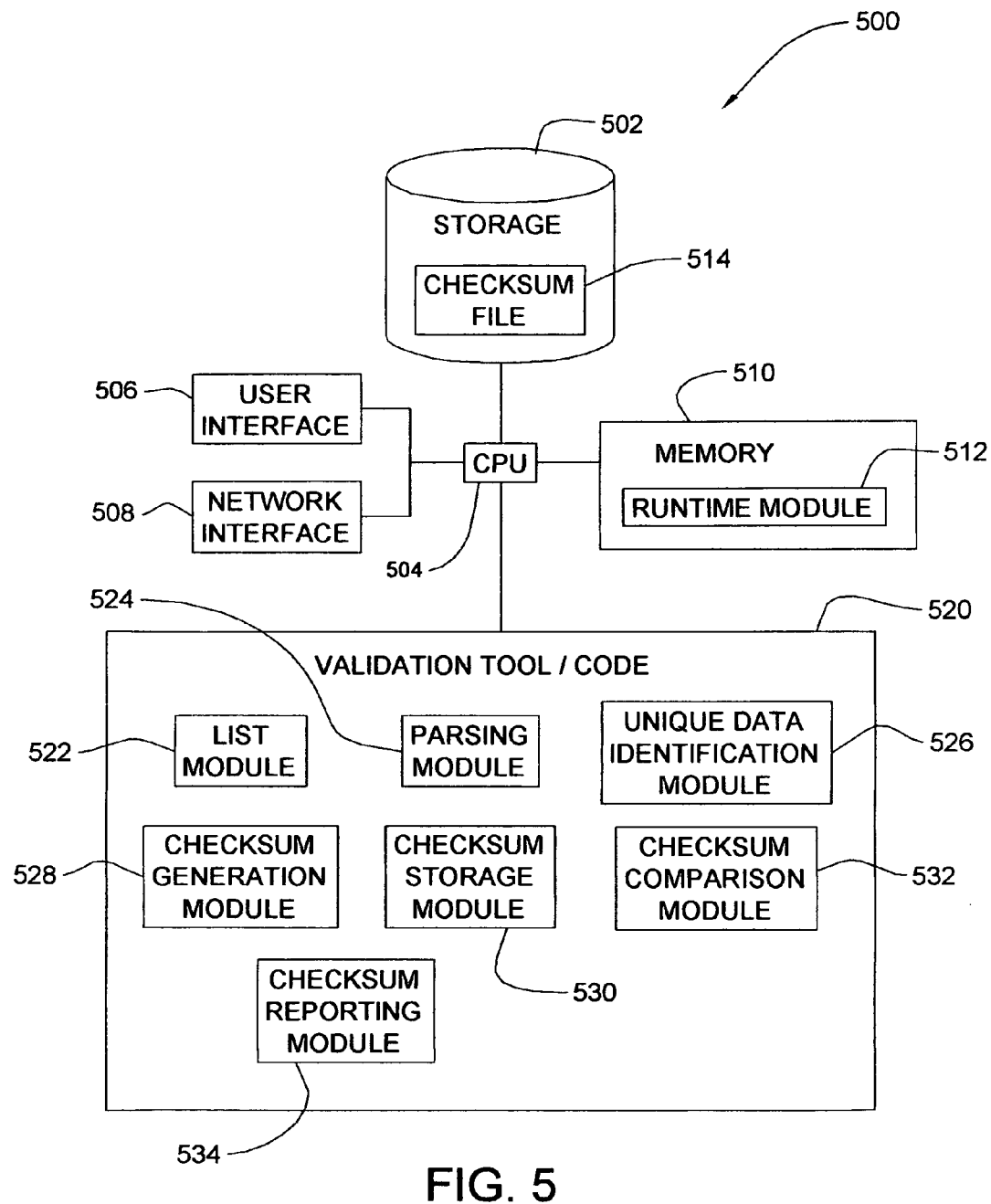
FIG. 5 is a schematic block system diagram illustrating a validation tool running on a system, the validation tool being configured to validate a runtime environment deployed across multiple systems, in accordance with an embodiment of the present invention.

Turning to FIG. 5, FIG. 5 shows an embodiment illustrating a validation tool or code 520 running on a system 500 that has a runtime module 512 deployed thereon, the validation tool or code 520 being configured to validate the runtime environment 512 deployed on the system 500, in accordance with an embodiment of the present invention. Preferably, the system 500 includes a central processing unit (CPU) 504, a local storage device 502, a user interface 506, a network interface 508, and a memory 510. The CPU 504 is configured generally to execute operations within the system/server 500. The user interface 506, in one embodiment, is configured to allow a user to interact with the system 500, including allowing input data and commands from a user and communicating output data to the user. The network interface 508 is configured, in one embodiment, to facilitate network communications of the system 300 over the communications channel 320 of the network 300 (FIG. 3). The local memory 510 is configured, in one embodiment, to store a broker runtime module 512. In particular, when the message broker application 420 (in FIG. 4) is executed, it causes the message broker code 426 to read the application code 428 stored in the database 402 to create the message broker application runtime environment or module 424, which is stored in local memory 512 in FIG. 5. Further, the system 500 includes a checksum file 514 stored within a database or storage 502, which stores the checksums computed for each message flow defined in the runtime module 512 deployed on the system 500. In one embodiment, as shown in FIG. 5, the validation tool 520 run on a system 500 comprises a logic unit that contains a plurality of modules configured to functionally execute the necessary steps of validating a runtime module deployed on a system. In particular, the validation tool 520 includes a list module 522, a parsing module 524, a unique data identification module 526, a checksum generation module 528, a checksum storage module 530, a checksum comparison module 532 and a checksum reporting module 534. The list module 522 of the validation tool 520 is configured to invoke the utility program provided in the broker application program to list the contents of each message flow defined in the instance of the application code corresponding to the runtime module 512 deployed on the system 500. Further, the parsing module 524 is configured to parse out the broker runtime module to separate out the application code from the message broker code in the runtime module. The unique data identification module 526 is configured to identify and ignore or discard a unique system or server specific data part of each message flow defined in the runtime module 512 that is specific to a particular server. The checksum generation module 528 generates a checksum for each message flow making up the application code by only writing a common executable data part of each message flow of the application code for creating the checksum. The checksum storage module 530 is configured to write to a file, for instance, the checksum file 514 stored in storage 502, each checksum generated for each message flow defined in the application code, that is, a set of checksums generated for a set of message flows defined in the application code. The checksum comparison module 532 is configured to compare the set of checksums generated for a computing system against another set of checksums generated for another computing system. Further, the checksum reporting module 534 is configured to identify or report any inconsistencies in deployment of a message flow on the computing system 500, that is, identify any checksum in a set of checksums generated that is different when comparing the set of checksums generated for one system with another set of checksums generated for another system. In one embodiment, the checksum reporting module 534 writes to a file, for instance a checksum file 514 in the local memory 510, the name of the message broker runtime module, the name of the execution group and the name of the message flow whose checksum is different than a checksum of a runtime module that it is being compared to. However, the checksums may be written to a file at another remote location. In an embodiment, the parsing module 524 is further configured to identify a starting point and an ending point for each message flow of the message flows defined in an instance of the application code of the runtime module deployed on the computing system 500 in order for the checksum generation module 528 to compute a separate checksum for each message flow defined in the runtime module deployed on the computing system 500.

In yet another embodiment, the present invention provides a computer program product for validating a runtime environment deployed across multiple servers on a network. The computer program product comprises a computer readable medium, which provides program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Preferably, the computer storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

The computer program product further comprises first program instructions to compute, using a validation tool, a first set of checksums corresponding to a set of message flows defined in an application code of a runtime module deployed on a first server of a plurality of servers connected via a network, the validation tool excluding in computing the first set of checksums any unique server identification data portion specific to the first server and to read only a common executable data portion of the application code deployed on the first server. In an embodiment, the first program instructions include instruction to invoke a utility to list contents for each of the set of message flows defined in the application code corresponding to the runtime module deployed on the first server. Further, in an embodiment, the first program instructions include instructions to write to a file the first set of checksums generated for the application code corresponding to the runtime module deployed on the first server. The computer program product further comprises second program instructions to run the validation tool on a second server of the plurality of servers for computing a second set of checksums corresponding to a set of message flows defined in the application code corresponding to the runtime module deployed on the second server, the validation tool excluding in computing the second set of checksums any unique server identification data portion specific to the second server and to read only a common executable data portion of the application code deployed on the second server. In an embodiment, the second program instructions include instructions to invoke a utility to list contents for each of the set of message flows defined in the application code corresponding to the runtime module deployed on the second server and to write to the file the second set of checksums generated for the application code corresponding to the runtime module deployed on the second server. The computer program product further comprises third program instructions to compare the second set of checksums generated for the second server with the first set of checksums generated for the first server to determine whether the application code corresponding to the runtime module deployed on the second server is identical to the application code corresponding to the runtime module deployed on the first server. The computer program product further comprises fourth program instructions to identify any server of the plurality of servers whose set of checksums generated is different from the first set of checksums generated for the first server. In an embodiment, the fourth program instructions include instructions to identify an execution group name, a message flow name and a broker name associated with any server of the plurality of servers whose set of checksums computed is different than the first set of checksums generated for the first server. Preferably, the first, second, third and fourth program instructions are stored on the computer readable medium.

Preferably, the computer program product is in a form accessible from the computer-usable or computer-readable medium, which provides program codes or instructions for use by or in connection with a computer or any instruction execution system. For the purposes of this description, a computer readable medium can be any device that can store the program code or instruction for subsequent execution by the instruction execution system, apparatus, or device. Preferable the computer readable medium can comprise an electronic, magnetic, optical, electromagnetic or semiconductor storage device. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc-read only memory (CD-ROM), compact disc-read/write (CD-R/W) and digital versatile/video disc (DVD). The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Figure 6:
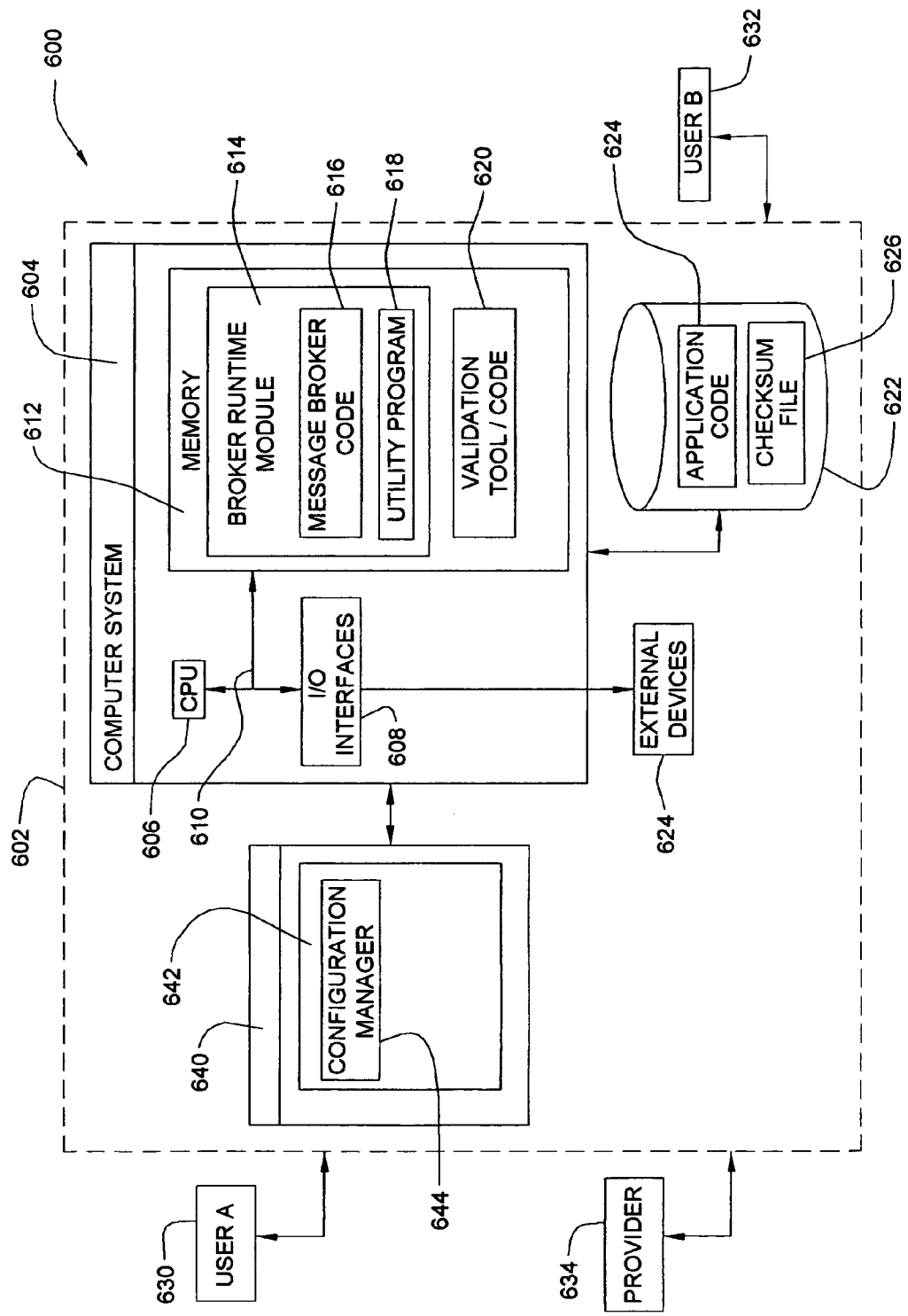
FIG. 6 is a schematic block system diagram illustrating an implementation of a computer program product for validating a runtime environment deployed across multiple computing systems, in accordance with an embodiment of the present invention.

Referring now to FIG. 6, there is illustrated a computer infrastructure system 600 illustrating an implementation of a computer program product for validating a runtime environment deployed across multiple servers on a network, according to the present invention. As depicted, system 600 includes a computer infrastructure 602, which is intended to represent any type of computer architecture that is maintained in a secure environment (i.e., for which access control is enforced). As shown, infrastructure 602 includes a computer system 604 that typically represents a server or the like. It should be understood, however, that although not shown, other hardware and software components (e.g., additional computer systems, such as, metric servers, administrative servers, routers, firewalls, etc.) could be included in infrastructure 602.

In general, a user A 630 interfaces with infrastructure 602 to verify a broker runtime module, for instance, broker runtime module 614 deployed on computing system 604 within infrastructure 602 by utilizing a validation tool 620 running within the local memory 612 of computing system 604. Similarly, one or more users, for instance, user B (designated by numeral 632) can interface with infrastructure 602 to verify a runtime module deployed on another system within infrastructure 602. To this extent, infrastructure 602 provides a secure environment. In general, the parties could access infrastructure 602 directly, or over a network via interfaces (e.g., client web browsers) loaded on computerized devices (e.g., personal computers, laptops, handheld devices, etc. not shown in FIG. 6). In the case of the latter, the network can be any type of network such as the Internet, a local area network (LAN), a wide area network (WAN), a virtual private network (VPN), etc. In any event, communication with infrastructure 602 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 602. It should be understood that under the present invention, infrastructure 602 could be owned and/or operated by a party, such as a provider 634, or by an independent entity. Regardless, use of infrastructure 602 and the teachings described herein could be offered to the parties on a subscription or fee-basis. In either scenario, an administrator at an administrative server or any other designated computer system (not shown in FIG. 6) could support and configure infrastructure 602.

Computer system 604 is shown to include a CPU (hereinafter "processing unit 606"), a memory 612, a bus 610, and input/output (I/O) interfaces 608. Further, computer system 600 is shown in communication with external I/O devices/resources 624 and storage system 622. In general, processing unit 606 executes computer program codes, such as the message broker code 616 that is stored in memory 610. Similarly, processing unit 606 executes the validation code 620 stored within the local memory 612 for validating the broker runtime module 614. Similarly, a CPU (not shown in FIG. 6) of computing system 640 executes the configuration manager 644 stored in memory 642 of system 640. While executing the validation tool 620, the processing unit 606 can read and/or write data, to/from memory 612, storage system 622, and/or I/O interfaces 608. In an embodiment, when the message broker application starts up, the message broker code 616 reads the application code 624 stored in the database 622 to create the Message Broker application runtime environment 614. Further, the system 602 stores or writes to a file, for instance, in the database storage 622, a checksum file 626, any checksums computed by the system 602. Furthermore, Bus 610 provides a communication link between each of the components in computer system 600. External devices 624 can comprise any devices (e.g., keyboard, pointing device, display, etc.) that enable a user to interact with computer system 600 and/or any devices (e.g., network card, modem, etc.) that enable computer system 600 to communicate with one or more other computing devices.

Computer infrastructure 602 is only illustrative of various types of computer infrastructures for implementing the invention. Moreover, computer infrastructure system 600 is only representative of various possible computer systems that can include numerous combinations of hardware. To this extent, in other embodiments, computer infrastructure system 600 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 606 may comprise a single processing unit, or be distributed across one or more processing units in one or more locations, e.g., on a client and server. Similarly, memory 612 and/or storage system 622 can comprise any combination of various types of data storage and/or transmission media that reside at one or more physical locations. Further, I/O interfaces 608 can comprise any system for exchanging information with one or more external devices 624. Still further, it is understood that one or more additional components (e.g., system software, math co-processing unit, etc.) not shown in FIG. 6 can be included in computer system 600. However, if computer infrastructure system 600 comprises a handheld device or the like, it is understood that one or more external devices 624 (e.g., a display) and/or storage system(s) 622 could be contained within computer infrastructure system 600, not externally as shown.

Storage system 622 can be any type of system (e.g., a database) capable of providing storage for information under the present invention. To this extent, storage system 622 could include one or more storage devices, such as a magnetic disk drive or an optical disk drive. In another embodiment, storage system 622 includes data distributed across, for example, a local area network (LAN), wide area network (WAN) or a storage area network (SAN) (not shown). Although not shown, additional components, such as cache memory, communication systems, system software, etc., may be incorporated into computer infrastructure 600.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of validating a first instance of an application program in executable, runtime form based on a second instance of the application program in executable, runtime form, the first and second instances of the application program installed in executable, runtime form in first and second computers, respectively, the method comprising the steps of:

a validation program tool, stored on a computer readable storage media for execution by a CPU in a computer, generating and recording a first checksum for the first instance of the application program while the first instance of the application program is installed in executable, runtime form in the first computer, the validation program tool generating the first checksum based in part on a program portion of the first instance of the application program that is (a) installed in executable, runtime form in the first computer and (b) common to the first and second instances of the application program, but not based on a first system data portion of the first instance of the application program that is (a) installed in executable, runtime form in the first computer, the first system data portion being specific and unique to the first computer and including a unique identifier of the first computer;

the validation program tool generating and recording a second checksum for the second instance of the application program while the second instance of the application program is installed in executable, runtime form in the second computer, the validation program tool generating the second checksum based in part on the program portion of the second instance of the application program in runtime form that is (a) installed in executable, runtime form in the second computer and (b) common to the first and second instances of the application program, but not based on a second system data portion of the second instance of the application program that is (a) installed in executable, runtime form in the second computer, the second system data portion being specific and unique to the second computer and including a unique identifier of the second computer; and the validation program tool comparing the first checksum to the second checksum, and if the first checksum does not match the second checksum, the validation program tool generating an electronic record that the first instance of the application program does not match the second instance of the application program.

2. The method of claim 1, wherein a first instance of a messaging program is also installed in executable, runtime form in the first computer and forms a first runtime program module with the first instance of the application program, the first instance of the messaging program controlling execution of the first instance of the application program during runtime; and the step of the validation program tool generating the first checksum further comprises the step of the validation program tool distinguishing, in the first runtime module, the common program portion in the first instance of the application program from the first instance of the messaging program, and not including the first instance of the messaging program in the determination of the first checksum.

3. The method of claim 2, wherein a second instance of the messaging program is also installed in executable, runtime form in the second computer and forms a second runtime program module with the second instance of the application program, the second instance of the messaging program controlling execution of the second instance of the application program during runtime; and the step of the validation program tool generating the second checksum further comprises the step of the validation program tool distinguishing, in the second runtime module, the common program portion in the second instance of the application program from the second instance of the messaging program, and not including the second instance of the messaging program in the determination of the second checksum.

4. A computer program product for validating a first instance of an application program in executable, runtime form based on a second instance of the application program in executable, runtime form, the first and second instances of the application program installed in executable, runtime form in first and second computers, respectively, the computer program product comprising:

a computer readable storage media;

first program instructions to generate and record a first checksum for the first instance of the application program while the first instance of the application program is installed in executable, runtime form in the first computer, the first program instructions generating the first checksum based in part on a program portion of the first instance of the application program that is (a) installed in executable, runtime form in the first computer and (b) common to the first and second instances of the application program, but not based on a first system data portion of the first instance of the application program that is (a) installed in executable, runtime form in the first computer, the first system data portion being specific and unique to the first computer and including a unique identifier of the first computer;

second program instructions to generate and record a second checksum for the second instance of the application program while the second instance of the application program is installed in executable, runtime form in the second computer, the second program instructions generating the second checksum based in part on the program portion of the second instance of the application program in runtime form that is (a) installed in executable, runtime form in the second computer and (b) common to the first and second instances of the application program, but not based on a second system data portion of the second instance of the application program that is (a) installed in executable, runtime form in the second computer, the second system data portion being specific and unique to the second computer and including a unique identifier of the second computer; and third program instructions to compare the first checksum to the second checksum, and if the first checksum does not match the second checksum, generate an electronic record that the first instance of the application program does not match the second instance of the application program; and wherein the first, second and third program instructions are stored in the computer readable storage media.

5. The computer program product of claim 4, wherein a first instance of a messaging program is also installed in executable, runtime form in the first computer and forms a first runtime program module with the first instance of the application program, the first instance of the messaging program controlling execution of the first instance of the application program during runtime; and the first program instructions generate the first checksum by distinguishing, in the first runtime module, the common program portion in the first instance of the application program from the first instance of the messaging program, and not including the first instance of the messaging program in the determination of the first checksum.

6. The computer program product of claim 5, wherein a second instance of the messaging program is also installed in executable, runtime form in the second computer and forms a second runtime program module with the second instance of the application program, the second instance of the messaging program controlling execution of the second instance of the application program during runtime; and the second program instructions generate the second checksum by distinguishing, in the second runtime module, the common program portion in the second instance of the application program from the second instance of the messaging program, and not including the second instance of the messaging program in the determination of the second checksum.

7. A computer system for validating a first instance of an application program in executable, runtime form based on a second instance of the application program in executable, runtime form, the first and second instances of the application program installed in executable, runtime form in first and second computers, respectively, the computer system comprising:

a CPU, a computer readable memory and a computer readable storage media;

first program instructions to generate and record a first checksum for the first instance of the application program while the first instance of the application program is installed in executable, runtime form in the first computer, the first program instructions generating the first checksum based in part on a program portion of the first instance of the application program that is (a) installed in executable, runtime form in the first computer and (b) common to the first and second instances of the application program, but not based on a first system data portion of the first instance of the application program that is (a) installed in executable, runtime form in the first computer, the first system data portion being specific and unique to the first computer and including a unique identifier of the first computer;

second program instructions to generate and record a second checksum for the second instance of the application program while the second instance of the application program is installed in executable, runtime form in the second computer, the second program instructions generating the second checksum based in part on the program portion of the second instance of the application program in runtime form that is (a) installed in executable, runtime form in the second computer and (b) common to the first and second instances of the application program, but not based on a second system data portion of the second instance of the application program that is (a) installed in executable, runtime form in the second computer, the second system data portion being specific and unique to the second computer and including a unique identifier of the second computer; and third program instructions to compare the first checksum to the second checksum, and if the first checksum does not match the second checksum, generate an electronic record that the first instance of the application program does not match the second instance of the application program; and wherein the first, second and third program instructions are stored in the computer readable storage media for execution by the CPU via the computer readable memory.

8. The computer system of claim 7, wherein a first instance of a messaging program is also installed in executable, runtime form in the first computer and forms a first runtime program module with the first instance of the application program, the first instance of the messaging program controlling execution of the first instance of the application program during runtime; and the first program instructions generate the first checksum by distinguishing, in the first runtime module, the common program portion in the first instance of the application program from the first instance of the messaging program, and not including the first instance of the messaging program in the determination of the first checksum.

9. The computer system of claim 8, wherein a second instance of the messaging program is also installed in executable, runtime form in the second computer and forms a second runtime program module with the second instance of the application program, the second instance of the messaging program controlling execution of the second instance of the application program during runtime; and the second program instructions generate the second checksum by distinguishing, in the second runtime module, the common program portion in the second instance of the application program from the second instance of the messaging program, and not including the second instance of the messaging program in the determination of the second checksum.

* * * * *